(12) United States Patent
Jungers et al.

(10) Patent No.: US 6,438,140 B1
(45) Date of Patent: Aug. 20, 2002

(54) DATA STRUCTURE, METHOD AND APPARATUS PROVIDING EFFICIENT RETRIEVAL OF DATA FROM A SEGMENTED INFORMATION STREAM

(75) Inventors: Patricia D. Jungers, San Mateo; Dru Nelson, Redwood City, both of CA (US)

(73) Assignee: DIVA Systems Corporation, Redwood City, CA (US)

( * ) Notice: Subject to any disclaimer, the term of this patent is extended or adjusted under 35 U.S.C. 154(b) by 0 days.

(21) Appl. No.: 09/196,297

(22) Filed: Nov. 19, 1998

(51) Int. Cl.$^7$ .............................. G06F 7/00; G06F 17/30
(52) U.S. Cl. ..................... 370/471; 370/490; 707/104.1
(58) Field of Search ................................ 707/102, 103, 707/104.1; 709/201, 213, 215; 711/202, 206, 207, 208; 348/725; 370/470, 471, 472, 473, 476, 477, 474, 478, 480, 486, 487, 489, 490, 521

(56) References Cited

U.S. PATENT DOCUMENTS 5,615,363 A * 3/1997 Jenness ..................... 395/614
5,838,912 A * 11/1998 Poon et al. ............. 395/200.34
6,177,930 B1 * 1/2000 Chernock et al. ........... 345/327
6,047,317 A * 4/2000 Bisdikian et al. ........... 709/217

* cited by examiner

*Primary Examiner*—Ricky Ngo
(74) *Attorney, Agent, or Firm*—Moser, Patterson & Sheridan LLP

(57) ABSTRACT

A data structure, method and apparatus providing efficient retrieval of data from a segmented information stream. The invention utilizes a segmented data stream having an initial directory payload portion and a following payload portion including one or more object tables. The directory includes table descriptors associated with each object table including various field indicative of parameters of the respective object table. One of the fields comprises a bit array having at least one bit corresponding to each of the segments in the respective object table. By changing a state of a corresponding bit upon receiving a table segment, the memory and processing resources required to read the segments associated with a table are decreased.

12 Claims, 11 Drawing Sheets

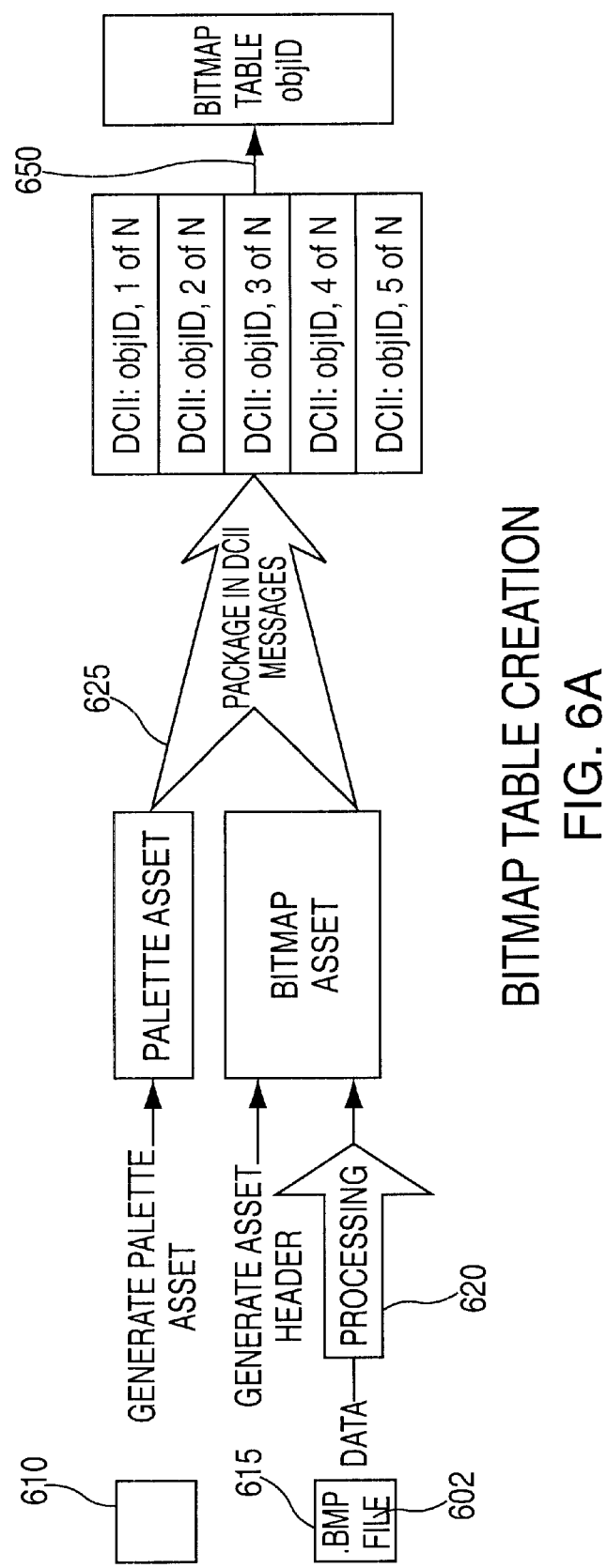

DATA STREAM CREATION

DATA STRUCTURE, METHOD AND APPARATUS PROVIDING EFFICIENT RETRIEVAL OF DATA FROM A SEGMENTED INFORMATION STREAM

The invention relates to communications systems generally and, more particularly, the invention relates to an efficient scheme for acquiring desired data, such as table or sequence data, from a packetized data stream.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

Information distribution systems utilizing information streams conforming to the above standards or subsets of the above standards are known. For example, an interactive digital video on demand (VOD) service known as the OnSet™ system is manufactured by DIVA Systems Corporation of Menlo Park, Calif. The OnSet™ system distributes audio-visual information to individual subscribers utilizing MPEG-like information streams. The OnSet™ system also allows subscribers to interactively control the delivery of audio-visual information using consumer-friendly commands, such as fast-forward (FF), rewind (REW), pause (PAUSE), play (PLAY) and the like.

The above-referenced standards, and other similar standards, provide for the delivery of proprietary data in addition to audio, video and other data to receiving and decoding devices, such as set top terminal (STTs). The proprietary data may be formatted into, e.g., an MPEG-2 standard private section format or the similar DigiCipher®II (DCII) format, which is used in STTs manufactured by General Instrument Corporation of Horsham, Pa. Using DCII terminology, proprietary data may be organized as one or more tables (i.e., logical groupings of data), where each table comprises one or more messages or segments. The messages or segments are then transport encoded in a known manner to produce a transport stream that is coupled to one or more STTs.

A STT decodes the transport stream in a known manner to extract the messages or segments. During the decoding process an error check, such as a circular redundancy check (CRC), is performed for each message or segment. If the message or segment is error-free, then it is passed to a controller for further processing (e.g., table re-assembly) by an application running within the STT. If the message or segment is not error-free, then an error handler is invoked. The typical error handler discards a message or segment having errors without notifying the application expecting to receive the message or segment.

Therefore, it is seen to be desirable to provide a method and apparatus that is able to compensate for the tendency of some STTs to discard or miss data segments without application notification. Specifically, it is seen to be desirable to provide a method and apparatus for tracking the delivery and re-assembly of received messages or segments into complete tables or sections, such that applications may readily ascertain whether necessary data structures have been received by, e.g., a STT or other information receiver.

SUMMARY OF THE INVENTION

The invention comprises data structure a method and apparatus providing efficient retrieval of data from a segmented information stream. The invention utilizes a segmented data stream having an initial directory payload portion and a following payload portion including one or more object tables. The directory includes table descriptors associated with each object table including various field indicative of parameters of the respective object table. One of the fields comprises a bit array having at least one bit corresponding to each of the segments in the respective object table. By changing a state of a corresponding bit upon receiving a table segment, the memory and processing resources required to read the segments associated with a table are decreased.

Specifically, a data structure according to the invention for providing at least one table within a segmented information stream comprising: a header portion, including a stream type identifier; and a payload portion, including a directory and the at least one table; the directory occupying at least a first segment within the payload portion of the information stream and including, for each of the at least one tables, a respective table description record, the table description record including indicia of table type and number of table segments, the table description record also including a segment bit array field, the segment bit array field including at least one bit corresponding to each of the number of table segments; the at least one table occupying one or more contiguous segments within the payload portion of the information stream.

BRIEF DESCRIPTION OF THE DRAWINGS

The teachings of the present invention can be readily understood by considering the following detailed description in conjunction with the accompanying drawings, in which:

FIG. 6A depicts a high level block diagram of a method for forming an object-representative table and suitable for use in the processing system of FIG. 3;

To facilitate understanding, identical reference numerals have been used, where possible, to designate identical elements that are common to the figures.

DETAILED DESCRIPTION

The invention will be primarily described using the terminology and language found in the DCII specification, and within the context of a set top terminal (STT). It will be appreciated by those skilled in the art that corresponding terminology and language exists in the MPEG-2 standard and in other standards. For example, the DCII concept of a message or segment is similar to the MPEG-2 concept of a sequence. Additionally, while the following description will focus on an embodiment of the invention utilizing a transport stream adapted to a particular data structure, it is important to note that the data structure provided by the invention may be practiced within the context of any packetized information stream utilizing a layered approach to information delivery.

Figure 1:
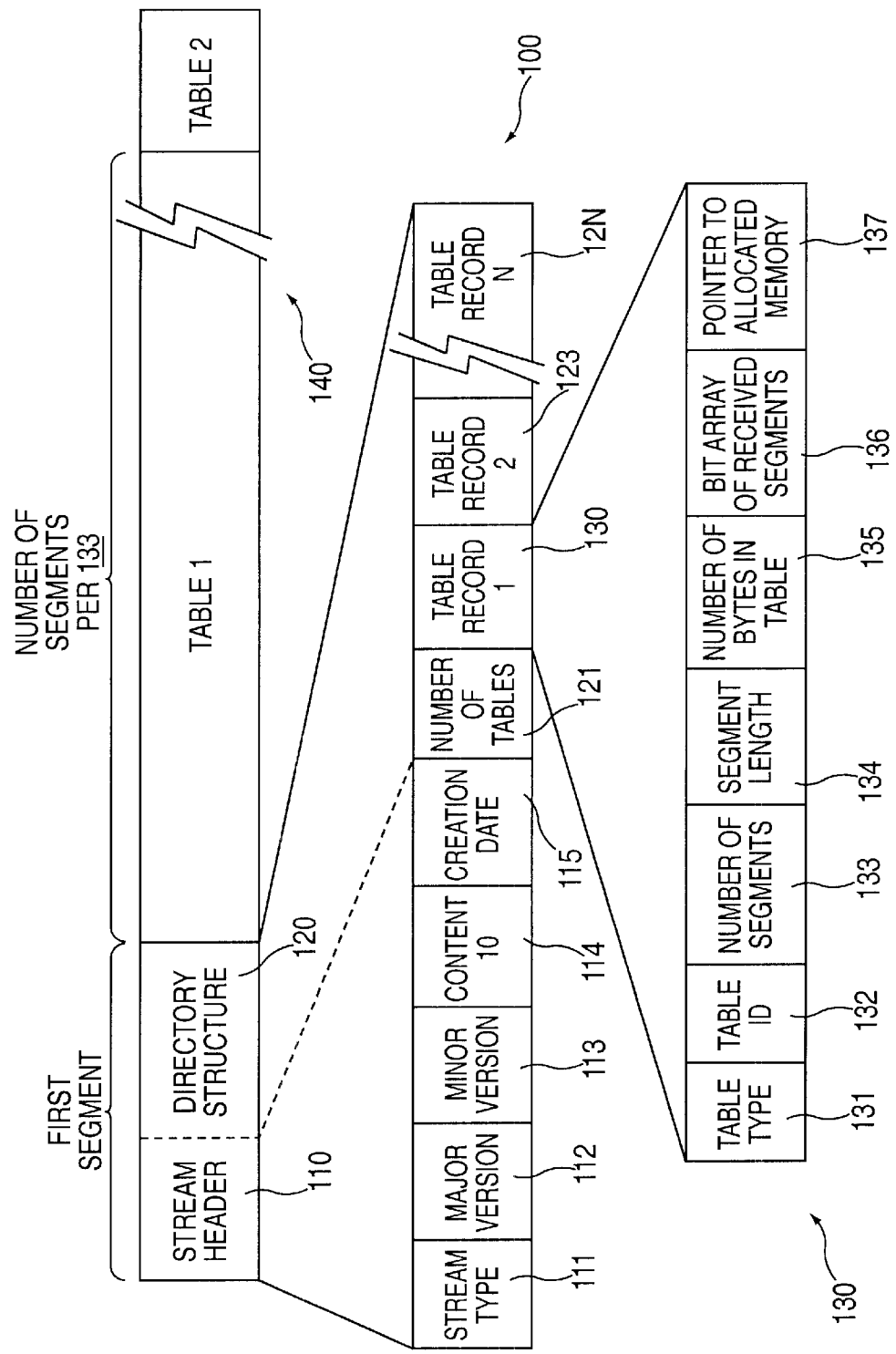
FIG. 1 depicts a graphical representation of a data structure according to the invention.

FIG. 1 depicts a graphical representation of a data structure according to the invention. Specifically, FIG. 1 depicts a data stream format 100. The data stream comprises a stream header 110, a directory structure 120 and one or more tables 140. It is important to note that the stream header 110 and the directory structure 120 are shown within the same segment (i.e., a first segment) of the data stream 100. However, if data stream 100 includes a large number of tables, then the directory may get too large to be contained within a single segment (e.g., 1024 bytes). In this case the directory will extend to one or more additional segments.

Stream header 110 comprises a stream type identifier field 111, a major version field 112, a minor version field 113, a content ID field 114, and a creation date field 115.

The stream type identifier field 111 is used to indicate the type of stream, illustratively, a bit map object having one of several possible resolutions (i.e., appropriate for one or more set top terminals). The stream type identifier field 111 is used by a receiving platform, such as a set top terminal, to reject unrecognized stream types.

The major version number 112 is used by the platform to reject streams with greater version numbers than the existing platform code.

The minor version number 113 is used to track minor differences in software versions. A platform may except streams with different minor version numbers than the platform code.

The content ID 114 is used by the platform to detect a stream change. Such a stream change may be due to, e.g., an updating of old data (i.e., an updated stock ticker) or an entirely new set of data.

The creation date 115 is used by, e.g., asset tracking systems optionally included within a platform to reference the creation date of the tables included within the data stream.

The directory structure 120 comprises a number of tables field 121, indicative of a number of table records within the directory structure, and a plurality of table records 130 and 123-12N, where N is the number of tables indicated in the number of tables field 121.

A table record, e.g., table record 130, comprises a table type field 131, a table identification number (ID) field 132, a number of messages field 133, a message length field 134, a number of bytes in table record field 135, a bit array of received segments field 136 and a pointer to an application object 137.

The table type field 131 indicates the type of data contained in the table. This information may be used by a platform such as a receiver or set top terminal to select or deselect tables from the stream.

The table ID field 132 corresponds to both the record index into the directory and to a field in the message header. This corresponds to the table number contained in the DCII message header. The platform uses this number to link a received message to a table.

The number of segments field 133 is used to initialize the number of remaining segments variable used by a platform receiving for the data stream.

The message length field 134 is used to place a message payload into an allocated portion of memory within the platform.

The number of bytes in a table record field 135 is used by the platform to allocate application heap memory which will be used to store the DCII message or segment payload (or the MPEG-2 equivalent).

The bit array of received segments field 136 facilitates message bookkeeping for the table represented by the table record. The received message header contains fields for the number of messages and current message received. Each message in the table is represented by a set bit in the bit array. When a message for the table is received the bit is reset. When an entire table is complete the bit arrays value is zero. The use of the bit array fields is discussed with greater detail below with respect to FIG. 4.

The pointer to allocated memory field 137 is used by the set top terminals to store the memory location allocated in the application heap. That is, in response to the number of bytes in a table description record field 135, the platform will allocate heap memory to store an object. The pointer is simply a indicia of the location within heap memory of the stored table.

A table contains a logical grouping of data. For example, a table may be used to store feature or format information that is used by a STT to execute a particular application. The table type stored in the directory record of each table is used by the individual set top to determine which tables it will received. When requesting a stream, the application for a given set top model indicates which table types it supports. When processing the directory message, the system compares the table type for each record against the supported table types. If a table is not supported, the bit array in its directory record is cleared to zero indicating that no segments are to be acquired for that table. This prevents segments from unsupported tables from being stored in set top memory.

Figure 2:
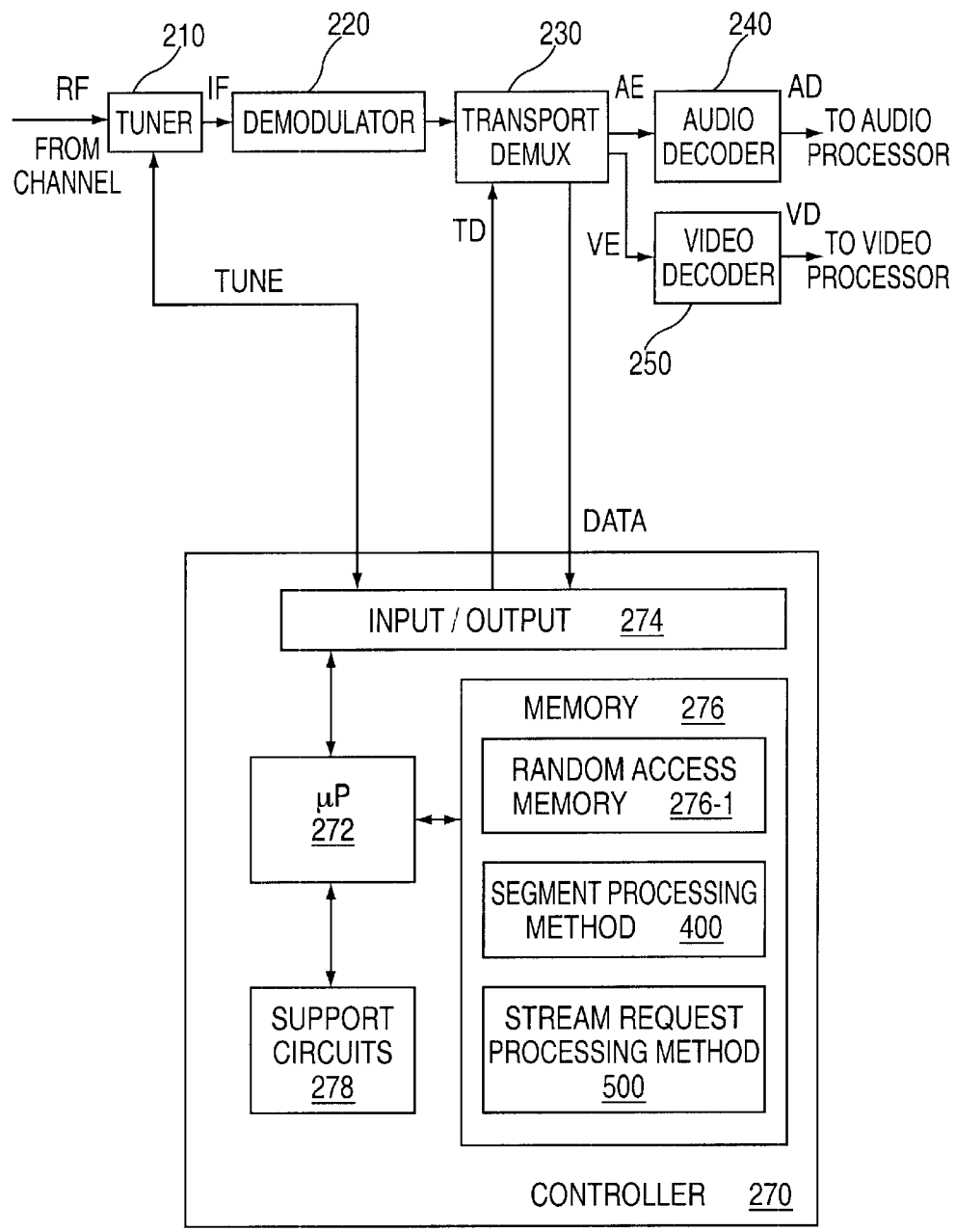
FIG. 2 depicts a high level block diagram of an information receiver.

FIG. 2 depicts a high level block diagram of an information receiver. Specifically, FIG. 2 depicts a set top terminal (STT) comprising a tuner 210, a demodulator 220, a transport demultiplexer 230, an audio decoder 240, a video decoder 250 and a controller 270. The STT includes various functionality useful in practicing the invention, as will be described below. Tuner 210 receiver, e.g., a radio frequency (RF) signal comprising a plurality of quadrature amplitude modulated (QAM) information signals from a channel such as a hybrid fiber optic cable television system. Tuner 210, in response to a control signal TUNE, tunes a particular one of the QAM information signals to produce an intermediate frequency (IF) information signal. Demodulator 220 receives and demodulates the intermediate frequency QAM information signal to produce an information stream, illustratively an MPEG transport stream. The MPEG transport stream is coupled to a transport stream demultiplexer 230.

Transport stream demultiplexer 230, in response to a control signal TD produced by controller 270, demultiplexes (i.e., extracts) at least one of a compressed audio information stream AE, a compressed video information stream VE and a data stream DATA.

The compressed audio information stream AE is coupled to audio decoder 240, which decodes the compressed audio information stream AE to produce an uncompressed audio information stream AD that is coupled to an audio processor (not shown) for subsequent presentation.

The compressed video stream VE is coupled to the video decoder 250, which decodes the compressed video stream VE to produce an uncompressed video stream VD that is coupled to a video processor (not shown) for subsequent processing and presentation on a display device.

The data stream DATA, illustratively an ancillary data stream or private data stream according to, e.g., the MPEG or DCII standards, is coupled to the controller 270 for further processing. It is important to note that, at least for the data stream DATA, transport stream demultiplexer 230 operates to discard those messages or segments that are found to contain errors (e.g., those messages or error that do not pass a CRC checksum test). Thus, the data stream DATA comprises only those messages or segments that were not discarded by the transport demultiplexer 230.

Controller 270 comprises a microprocessor 272, an input output module 274, a memory module 276 and support circuitry 278. The microprocessor 272 cooperates with conventional support circuitry 278 such as power supplies, clock circuits, cache memory and the like as well as circuits that assist in executing the software routines. The controller 270 also contains input/output circuitry 274 that forms an interface between the controller 270 and the tuner 210 and the transport demultiplexer 230. Although the controller 270 is depicted as a general purpose computer that is programmed to perform specific functions in accordance with the present invention, the invention can be implemented in hardware as an application specific integrated circuit (ASIC). As such, the process steps described herein are intended to be broadly interpreted as being equivalently performed by software, hardware, or a combination thereof.

Other set top terminals suitable for use with the present invention are the General Instrument Corporation Models DCT-1000 and DCT-1200 Digital Interactive Consumer Terminals.

Figure 4A:
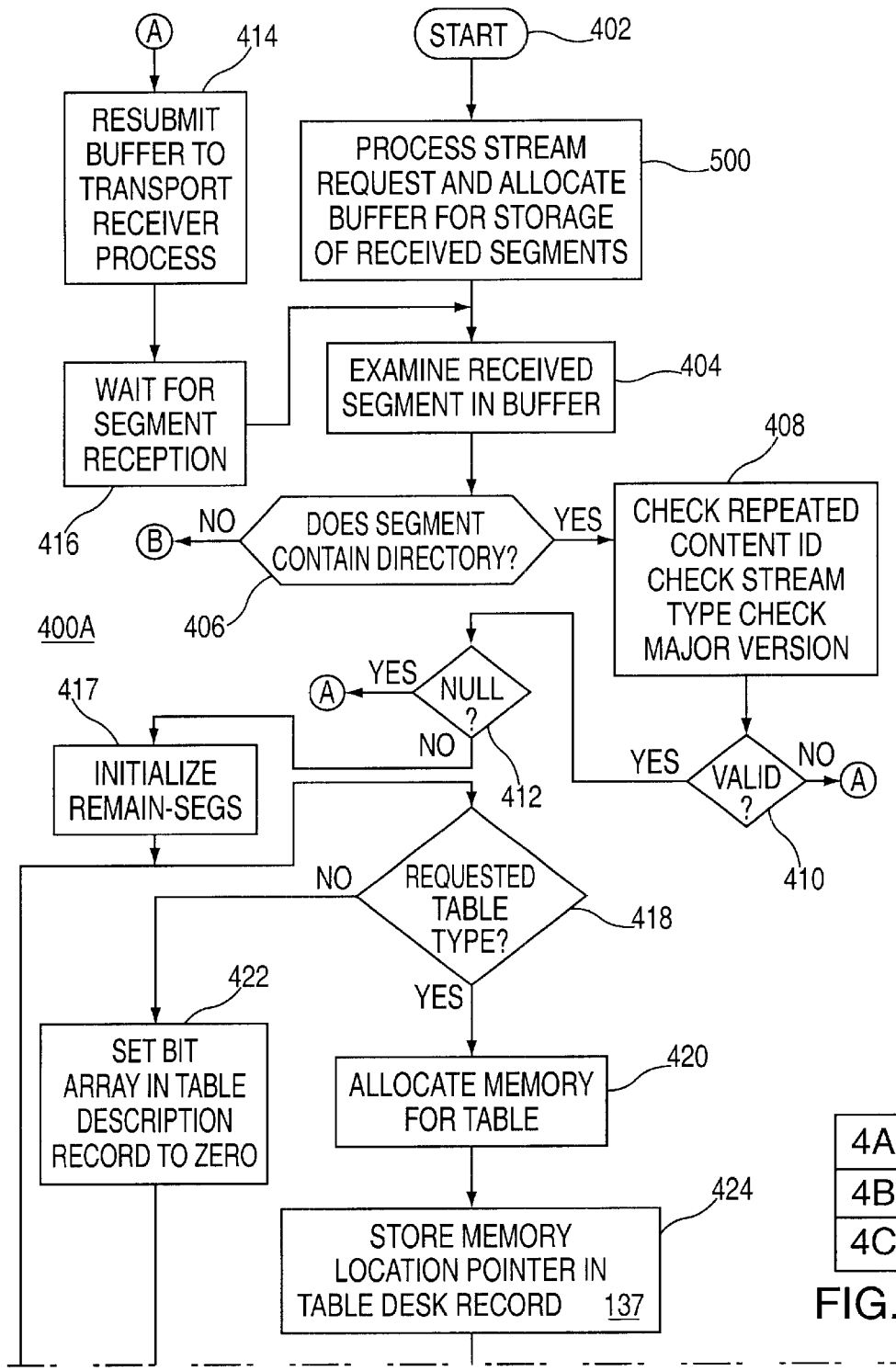
FIG. 4 depicts a segment processing method according to the invention.
Figure 4B:
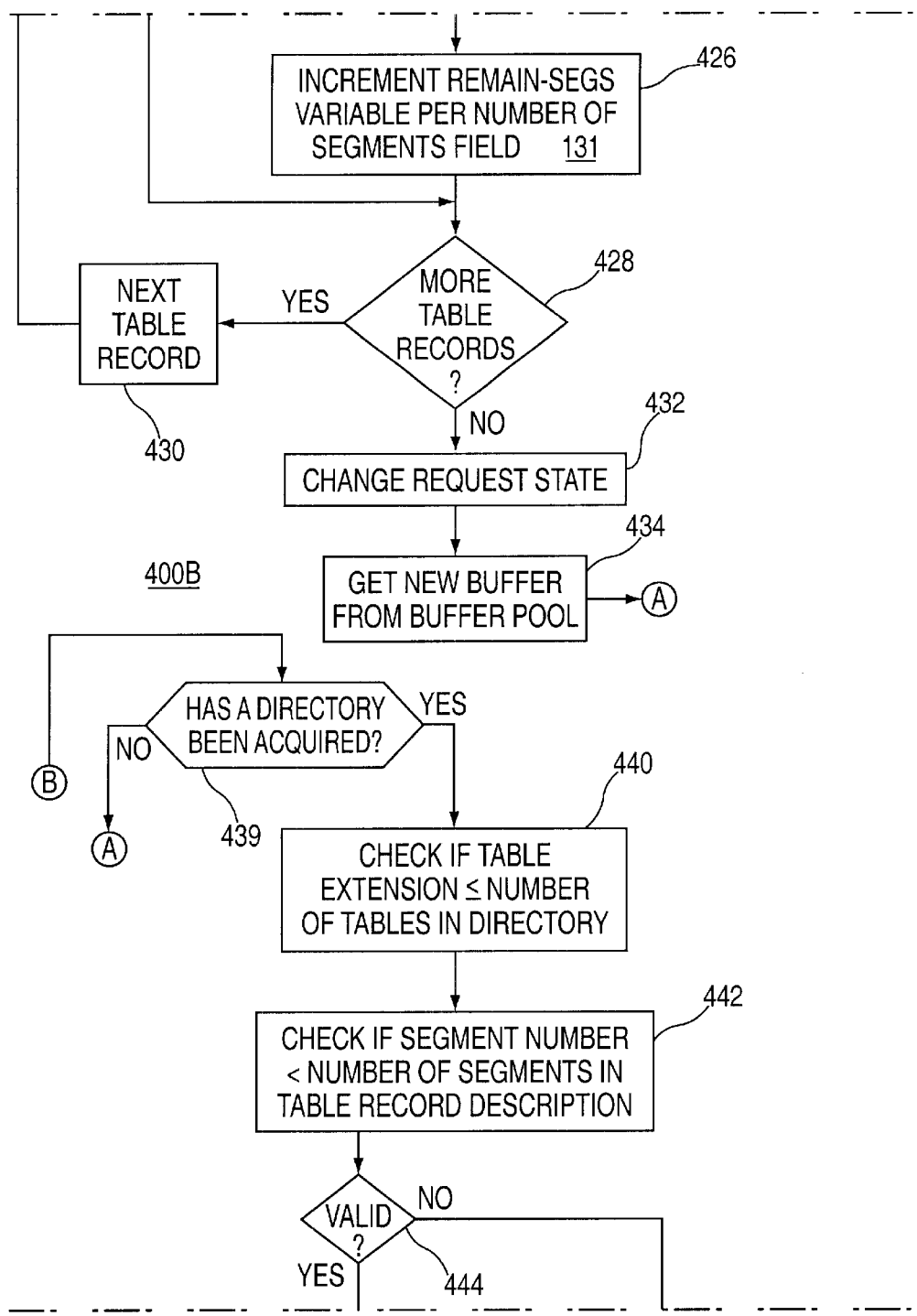
Figure 4C:
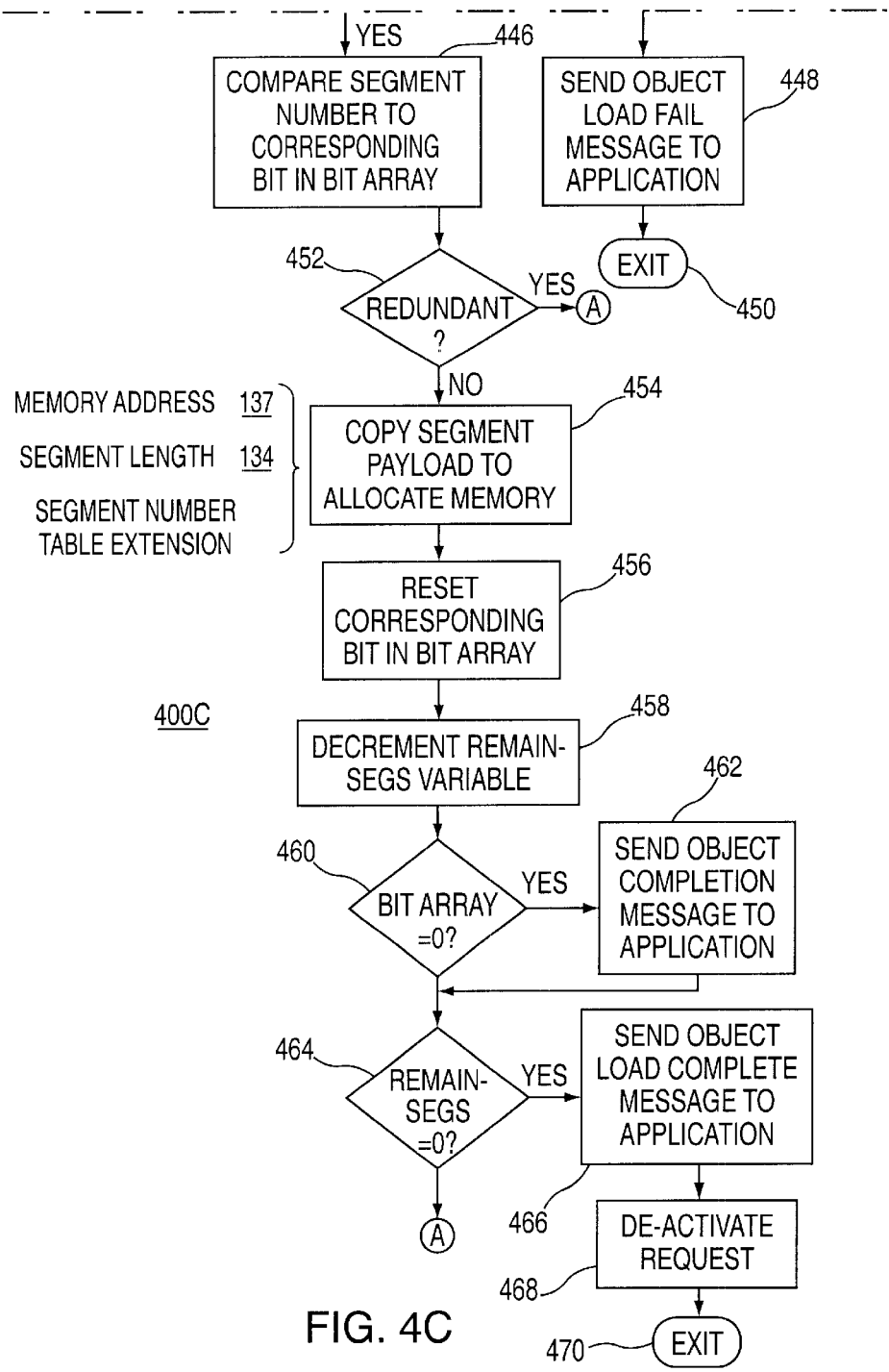

FIG. 4 depicts a segment processing method 400 according to the invention. Specifically, FIG. 4 depicts a method for processing a message or segment received from, e.g., transport demultiplexer 230 via the DATA stream path. It must be noted that FIG. 4 comprises FIG. 4A and FIG. 4B, which are intended to be viewed together, per the diagram included within FIG. 4A.

The segment processing method 400 is entered at step 402 and proceeds to step 500. At step 500 the method processes a stream request received from an application program and allocates a buffer for storing a received stream segment or message. After receiving a segment and storing the received segment in the allocated buffer, the method 400 proceeds to step 404.

At step 404 the received message stored in the allocated buffer is examined. The method 400 then proceeds to step 406, where a query is made as to whether the received segment contains a directory. If the query at step 406 is answered negatively, then the method 400 proceeds to step 440. If the query at step 406 is answered affirmatively, then the method 400 proceeds to step 408.

At step 408 several validity checks are performed on the received segment. Specifically, the repeated content ID is checked to determine if the received directory is merely a second or even third copy of a previously processed directory. Additionally, the stream type field is checked to determine if the received stream is of the type that can be processed by the receiver (e.g., a set top terminal, receiver platform and the like). Finally, the major version field 112 is checked to determine whether the stream version is compatible with the version of software or firmware running on the platform. The method 400 then proceeds to step 410, where a query is made as to whether the received stream is valid for this platform. If the query at step 410 is answered negatively, then the method 400 proceeds to step 414. If the query at step 410 is answered affirmatively, then the method 400 proceeds to step 412.

At step 412, a query is made as to whether the received directory comprises a null directory. That is, a query is made as to whether the received directory is one of several directories defined as null directories that are used by the set top terminal to indicate a stream change. For example, in one embodiment of the invention, the data stream format is adapted such that the header portion of the format includes three null directory streams, where each null directory stream includes a content ID of zero. If the query at step 412 is answered affirmatively, then the method 400 proceeds to step 414. If the query at step 412 is answered negatively, then the method 400 proceeds to step 417, where a variable REMAIN_SEGS is initialized to zero REMAIN_SEGS is used to store the total number of segments to be processed, e.g., the total number of segments contained in each of the tables. The REMAIN_SEGS does not include the segment (s) used for the directory itself. The method 400 then proceeds to step 418.

At step 414 the buffer containing the received segment is resubmitted to the transport receiver for processing. That is, the memory allocated to the segment input buffer function is allowed to be overwritten by the next received segment. The method 400 then proceeds to step 416, where it waits for the next segment to be received. Upon receiving the next segment, the method 400 proceeds to step 404, where the segment is examined.

At step 418 a query is made as to the table type requested by the application program. Specifically, a query is made as to whether the first table record within the directory is of the type requested by the application program. If the query at step 418 is answered negatively, then the method proceeds to step 422, where the bit array field 136 in the present table description record 130 is set to zero. The method 400 then proceeds to step 428.

If the query at step 418 is answered affirmatively, then the method 400 proceeds to step 420, where memory is allocated for the table. Specifically, at step 420 the table record is examined to determine the amount of memory necessary to store the table information. This amount of memory is then allocated to the table. The memory typically comprises heap within a stack or other variable memory arrangement utilized by the application program requesting the table. The method 400 then proceeds to step 424, where a pointer to the allocated memory location (e.g., a pointer into the application heap) is stored in the pointer to allocated memory field 137 of the table record 130. The method 400 then proceeds to step 426.

At step 426, a remaining segment (REMAIN_SEGS) variable, which was initialized to zero at step 217, is incremented by the quantity contained within the number of segments field 131 of the table description record 130 associated with the present table being processed in the received directory. The method 400 then proceeds to step 428. At step 428, a query is made to determine whether more table description records remain to be processed within the received directory. That is, a query is made as to whether steps 418 through 426 have been processed for each of the table description records contained within the received directory. If the query at step 428 is answered affirmatively, (i.e., more table description records remain to be processed), then the method 400 proceeds to step 430, where the next table descriptor record is retrieved from the received directory. The method 400 then proceeds to step 418. If the query at step 428 is answered negatively, then the method 400 proceeds to step 432.

At step 432 a request state field within a request record is modified to indicate that the directory processing is complete. The method 400 then proceeds to step 434. At step 434 a new buffer from the buffer pool is retrieved. That is, a new buffer is formed from a pool of memory resources available for such use, thereby preserving the previous buffer which includes the previous received segment (e.g., a received directory). The method 400 then proceeds to step 414, where the new buffer is submitted to the transport receiver process, and, the method 400 proceeds to step 416 to wait for the next segment.

In the exemplary embodiment, a fixed number of static buffers (8) are allocated for the purpose of storing, e.g., DCII messages or segments received by the transport processor. While servicing a data request, a subset of these buffers are submitted to the transport processor. Buffers containing valid, non-redundant directories are removed from circulation and replaced by other buffers from the buffer pool. All messages containing non-directory data are processed (i.e., data copied or ignored) and resubmitted to the transport processor for reuse. When a directory is no longer needed, it is returned to the buffer pool. In this manner, only data used by the application is copied. The copy operation is also used to reassemble the necessary data. The copy operation does not copy data used for facilitating the process (i.e., Stream header and directory).

It is important to note that by allocating additional buffers each time a valid, non redundant directory or table segment is retrieved, the amount of memory resources within a set top terminal or other (typically) memory resource constrained device may be preserved. This architecture is entirely different than architectures which utilize an array or other large memory structure for storing received segments or other information stream components. This buffer allocation structure essentially grows as needed to accommodate only the information that is both useful, valid and not redundant. Thus, upon processing an entire data stream the memory allocated to store that stream is only that amount of memory necessary to store those portions (or the entirety) of the stream that are required by the application or capable of being processed on the platform or set top terminal receiving this stream.

As previously noted, a query was made at step 406 to determine if a received segment contained a directory. If the query at step 406 was answered negatively, then the method 400 proceeds to step 439. At step 439 a query is made as to whether a directory has been previously acquired. If the query at step 439 is answered affirmatively, then the routine 400 proceeds to step 440. If the query at step 439 is answered negatively, then the routine 400 proceeds to step 414.

At step 440 the method 400 checks to see if the table extension is less than or equal to the number of tables in a previously received directory. That is, a query is made as to whether the table extension number of the received table segment is such that the table cannot be one of the tables having a table description record 130 in the directory structure 120 of the previously retrieved directory. This condition may occur in the case of a data creation error or directory from one stream applied to another stream. The method 400 then proceeds to step 442.

At step 442 the method checks to see if the segment number of the received segment is less than the number of segments field 133 of the table description record 130 of the presently received table. That is, a query is made as to whether the received non-directory segment (i.e., a table segment) is part of the table being presently received. The method 400 then proceeds to step 444.

At step 444 acquire is made as to whether segment is valid. That is, a query is made as to whether the table extension in the segment header is less than or equal to the number of tables listed in the directory, and, additionally, the segment number of the received segment in the segment header is less than the number of segments listed in the corresponding table description record (per steps 440 and 442). If the query at step 444 is answered negatively, i.e., an invalid segment) then the method 400 proceeds to step 448. At step 448 an "object load fail" message is sent to the application, and the method 400 proceeds to step 450 where it is exited. If the query at step 444 is answered affirmatively, then the method 400 proceeds to step 446.

At step 446 the segment number of the received segment is compared to a corresponding bit in the bit array field 136 of the table descriptor record 130. As previously noted, the bit array field includes one bit for each segment associated with the corresponding table. Thus, in the case of a table comprising 30 segments (as indicated by the number of segments field 133), the bit array of received segments field will comprise a 30 bit field, where each of the 30 bits is associated with a corresponding segment of the table. Prior to reading or receiving any of the table segments, the bit array of received segments field is set to a first logical state, illustratively all ones. As each segment of the table is received, the bit within the bit array of received segments field corresponding to the successfully received segment is set to zero. In this manner it is quickly and easily determined whether or not a received segment has been received and processed previously. Thus, at step 446 the method 400 compares the segment number of the received segment to the corresponding bit in the bit array of received segments field 136 of the table descriptor record 130. The method 400 then proceeds to step 452.

At step 452 a query is made as to whether the received segment is redundant. That is, a query is made as to whether the bit within the bit array of received segments field 136 of the table descriptor record 130 corresponding to the received segment has been set to zero. If the query at step 452 is answered affirmatively (i.e., the received segment is redundant), then the method 400 proceeds to step 414. If the query at step 452 is answered negatively, then the method 400 proceeds to step 454.

At step 454 the segment payload is copied to the memory allocated at step 420 for storing the segment. As previously noted, this allocated memory comprises (typically) a portion of heap or stack memory associated with the application program. Moreover, since the application program is receiving one or more tables, the actual memory allocation comprises an index memory allocation. Thus, at step 454, the received segment payload is copied to the allocated memory based upon the memory address pointer field 137, the segment length field 134, the particular segment number of the received segment and the table extension. The method 400 then proceeds to step 456.

At step 456 the bit within the bit array of received segments field corresponding to the received segment is reset (i.e., set to zero), thereby indicating that the received segment has been received and processed and that any further reception of this segment may be ignored as being redundant. The method 400 then proceeds to step 458.

At step 458 the REMAIN_SEGS variable is decremented by one. That is, the variable indicative of the remaining number of segments within the stream to be processed is decremented by one. The method 400 then proceeds to step 460.

At step 460 a query is made as to whether the bit array of received segments field 136 of the table descriptor record 130 is equal to zero. That is, a query is made as to whether all of the bits corresponding to segments to be received have been set to zero, thereby indicating that all of the segments have in fact been received. If the quire at step 460 is answered affirmatively, then the method 400 proceeds to step 462, where a "object completion message" is set to the application. The method 400 then proceeds to step 464.

At step 464 a query is made as to whether the REMAIN_SEGS variable is equal to zero. That is, a query is made as to whether all of the segments within the data stream have been processed. It should be noted that the total number of segments to be processed comprise the one directory segment and the sum of the one directory segment and the number of segments associated with each of the tables referenced within the directory. Thus, in the case of four tables comprised of 30 segments each, the total number of segments to be processed will be 121 segments 120 excluding the directory). If the query at step 464 is answered affirmatively, then the method 400 proceeds to step 466. If the query at step 464 is answered negatively, then the method 400 proceeds to step 414 where the buffer is resubmitted to the transport receiver process and the method 400 waits for reception of the next segment.

At step 466, the method 400 sends a "object load complete" message to the application. The method 400 then proceeds to step 468 where the application stream request is de-activated. Among the various housekeeping activities of the request deactivation step 468, all outstanding buffers are returned to the buffer pool thereby preventing memory leaks. Additional housekeeping activities are readily known to those skilled in the art. The method 400 then proceeds to step 470 where it is exited.

Figure 5:
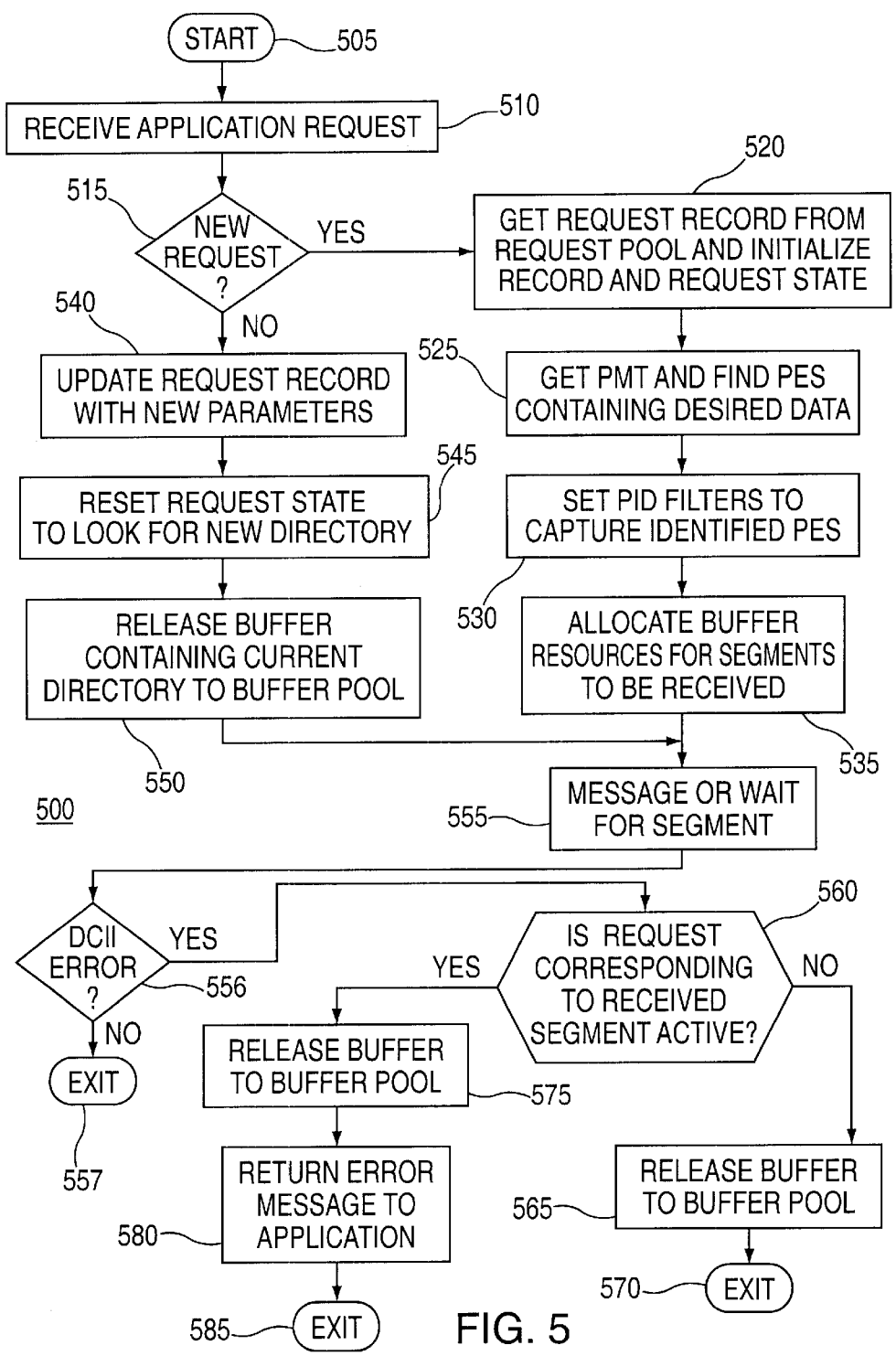
FIG. 5 depicts a stream request processing method suitable for use in the segment processing method of FIG. 4.

FIG. 5 depicts a stream request processing method 500 suitable for use in the segment processing method 400 of FIG. 4. Specifically, FIG. 5 depicts a method for initially responding to a stream request by, e.g., an application running within a set top terminal or other platform.

The method 500 is entered at step 505 and proceeds to step 510 where an application request for a table or tables is received. The method 500 then proceeds to step 515, where a query is made as to whether the received request is a new request. That is, a query is made as to whether the received request has been made before and remains unfulfilled for some reason. If the query at step 515 is answered negatively, then the method 500 proceeds to step 540. If the query at step 515 is answered affirmatively, then the method 500 proceeds to step 520.

At step 520 a request record is retrieved from a request pool and initialized. Additionally, a request state is reset to look for a new directory. The request state is used to determine whether the request needs a directory, is acquiring tables, or has been completed and is in cleanup mode. Once a directory has been acquired the state will change to running mode. Thus, at step 520 the request state is reset from running mode to, essentially, "need a directory mode." The buffer containing the previously acquired directory is released to the buffer pool and a new directory must be acquired. The method 500 then proceeds to step 525.

At step 525 a program map table (PMT) is retrieved and examined to determine which packetized elementary stream (PES) or program specific information stream (PSI) contains the data associated with the desired table or tables requested. The method 500 then proceeds to step 530. At step 530 packet identification (PID) filters are set to capture the identified PES or private data stream, that is, the controller 270, via the control signal TD, causes the transport demultiplexer 230 to demultiplex the data stream DATA including the identified PES or private data stream. The method 500 then proceeds to step 535.

At step 535 buffer resources are allocated for the segments to be received. That is, as previously described with respect to the buffer management functions of the present invention, a portion of random access memory 276-1 within memory unit 276 is allocated to receiving the data stream DATA produced by transport demultiplexer 230. The method 500 then proceeds to step 555, where it waits for a message to be received. That is, at step 555 the method 500 waits for an allocated buffer to be filled by the received data stream DATA such that the allocated buffer includes a message or segment.

At step 554 an existing request record is updated with new parameters. That is, since the application request received at step 510 is, in this case, an existing application request, the existing application request record is updated with parameters included within the received application request. The method 500 then proceeds to step 545.

At step 545 the request state is reset such that the retrieved data stream DATA is examined to find a new directory (i.e., a new directory segment or directory message). The method 500 then proceeds to step 550.

At step 555 an allocated buffer presently containing a currently received directory is released to the buffer pool. That is, a buffer allocated to the old request during step 535 is released to the buffer pool since a new buffer already allocated will be used to store the next received directory segment. The method 500 then proceeds to step 555 where it waits for the next message or segment to be received.

After receiving the next message or segment (step 555), the method 500 proceeds to 556, where a query is made as to whether an error has occurred. That is, at step 556 a query is made as to whether a DCII (or MPEG2 or other standard) transport error has occurred. If the query at step 556 is answered negatively, the method 500 proceeds to step 557 where it is exited. In the case of no error the received message or segment is suitable for further processing by, e.g., the segment processing method 400 of FIG. 4. If the query at step 556 is answered affirmatively, then the method 500 proceeds to step 560.

At step 560 a query is made as to whether the request corresponding to the received segment is active. That is, a query is made as to whether a previous request from an application received at 510 and further processed by steps 515 through 550 that resulted in a received message or segment is still, in fact, active (i.e., not canceled, invalid or expired). If the query at step 560 is answered negatively (i.e., the received message or segment is associated with an inactive request), then the method 500 proceeds to step 565. At step 565 the buffer including the received message or segment is released to the buffer pool, and the method 500 proceeds to step 570 where it is exited.

If the query at step 560 is answered affirmatively (the received segment corresponds to an active request), then the method 500 proceeds to step 575, where the buffer including the received message or segment is released to the buffer pool. The method 500 then proceeds to step 580, where an error message is returned to the requesting application. The method 500 then proceeds to step 585 where it is exited.

Step 560 is used to process corrupted or otherwise error compromised received messages or segments. In a case of a corrupted received segment that is not associated with an active request, the buffer including the received segment is simply released and the routine continues on without signaling any error condition. However, in the case of corrupted received a segment that is associated with an active request, it is important to signal to the application that an error has in fact occurred, as well as releasing the buffer to the buffer pool. It is important to note that many set top terminals, information stream receivers and other platforms do not provide an indication of error such as is queried for in step 556. That is, many such platforms or set top terminals simply discard corrupted or erroneous messages prior to coupling them to the controller. For example, where transport demultiplexer 230 discards corrupted messages, there will likely never be an affirmative answer to the query at step. 556, since all erroneous messages or segments are discarded prior to being coupled to a controller 270. However, there will be a discontinuity in terms of segment order that may be noted.

Figure 3:
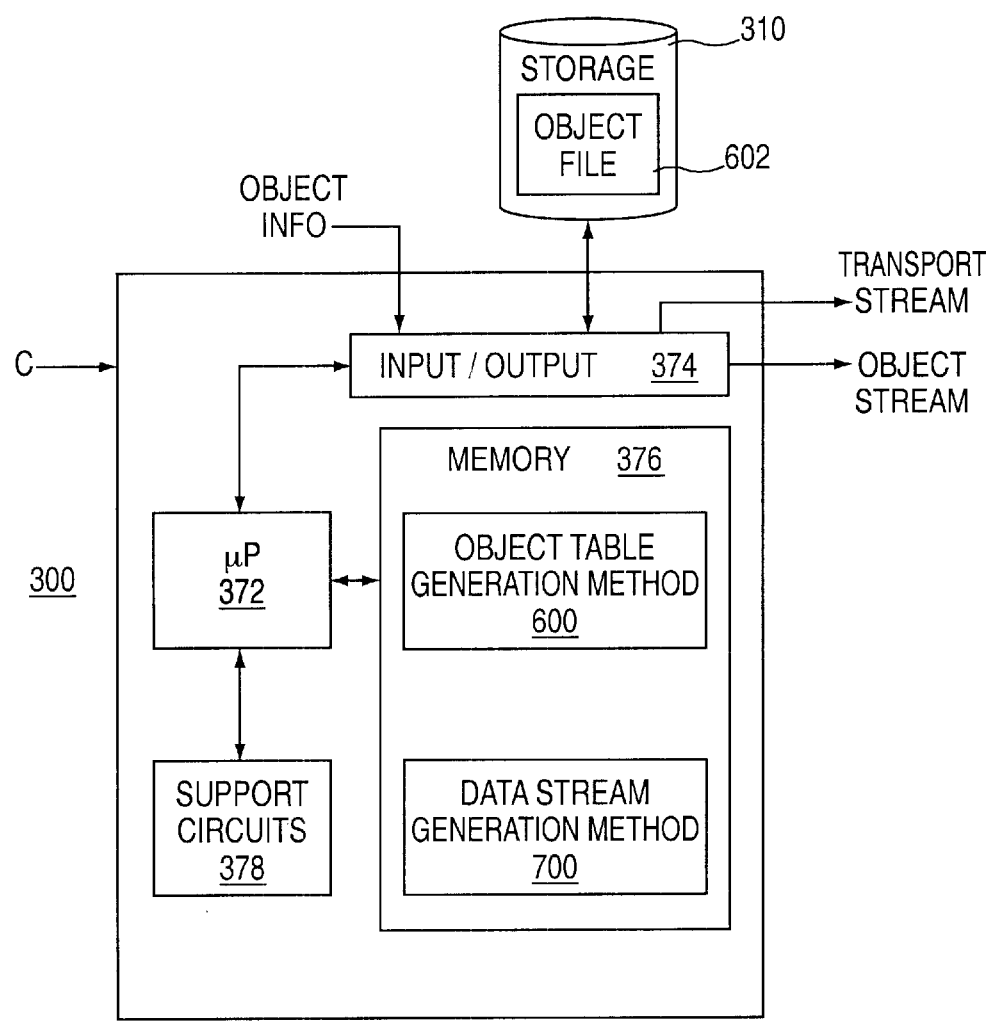
FIG. 3 depicts a high level block diagram of a processing system suitable for generating a data stream according to the invention.

FIG. 3 depicts a high level block diagram of a processing system suitable for generating a data stream according to the invention. Specifically, FIG. 3 depicts a processing system 300 that is used to generate a data stream according to the invention in response to object data or other data. The processing system is responsive to a control signal C that provides various parameters for adapting the processing functions of the processing system (e.g., output bitrate, type of stream to produce and the like).

The processing system 300 comprises a mass storage device 310 including an object file 602, and a controller 370 including a microprocessor 372, an input/output module 374, a memory module 376 and support circuitry 378. The microprocessor 372 cooperates with conventional support circuitry 378 such as power supplies, clock circuits, cache memory and the like as well as circuits that assist in executing the software routines. The controller 370 also contains input/output circuitry 374 that forms an interface between the controller 370 and a transport system or network (not shown).

The controller 370 retrieves object file information form the mass storage device 310 or from an optional data input signal OBJECT INFO. The retrieved object of other data is then processed according to the methods of FIG. 6 and FIG. 7, which will be discussed in more detail below. A resulting data stream TRANSPORT STREAM is coupled to a transport system (not shown) as a data stream or to other processing equipment (not shown) as, e.g., a DCII message or segment stream OBJECT STREAM.

Although the processing system 300 is depicted as a general purpose computer that is programmed to perform specific functions in accordance with the present invention, the invention can be implemented in hardware as an application specific integrated circuit (ASIC). As such, the process steps described herein are intended to be broadly interpreted as being equivalently performed by software, hardware, or a combination thereof.

Figure 6B:
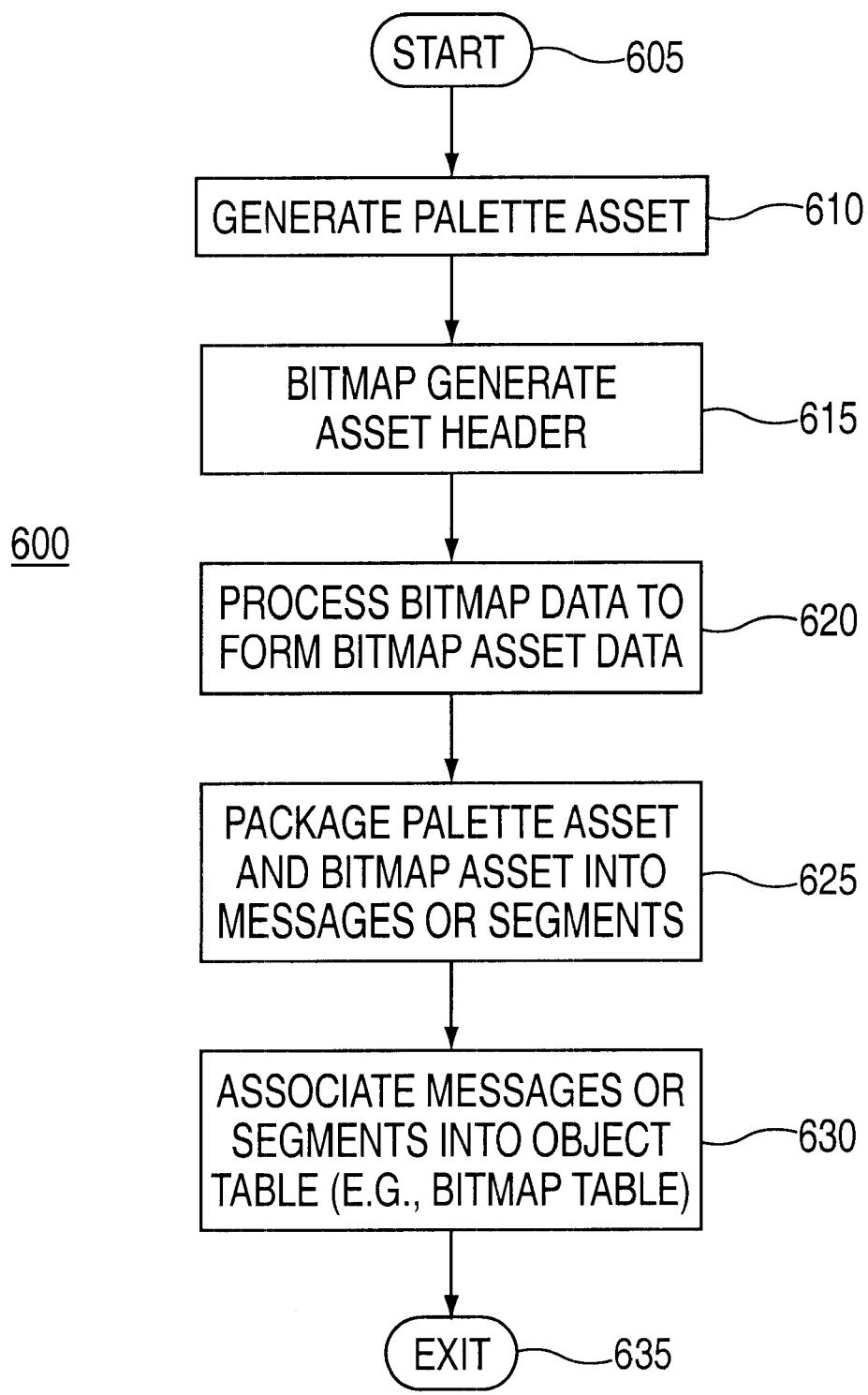
FIG. 6B depicts a flow diagram of the method of FIG. 6A.

FIG. 6A depicts a high level block diagram of a method for forming an object-representative table and suitable for use in the processing system of FIG. 3. FIG. 6B depicts a flow diagram of the method of FIG. 6A. It should be noted that FIG. 6A and FIG. 6B are different depictions of substantially the same method for forming an object table. Specifically, FIG. 6A and FIG. 6B include common reference designators indicative of common steps for forming the object table. Thus, while the following discussion will refer primarily to FIG. 6B, the cited reference designators will be applicable to FIG. 6A and FIG. 6B.

It must also be noted that FIGS. 6A and 6B describe a method for generating a bit map table object from a bit map file (i.e., a ".bmp" file). However, the method of FIGS. 6A and 6B may be readily adapted to generate object tables from any type of object, such as a relational data base object, an onscreen object, a dynamic memory or linked list object and the like.

The method 600 of FIGS. 6A and 6B is entered at step 605 and proceeds to step 610. At step 610 a palette asset is generated. That is, a palette attribute of the bit map file comprising indicia of the colors necessary to form the bit map image within the bit mat file is extracted from the bit map file as a separate object, attribute or asset. The method 600 then proceeds to step 615.

At step 615 a bit map asset header is generated from the bit map file 602. The bit map asset header includes information that will be used to reconstruct the bit map object at, e.g., a set top terminal, information receiver or other platform eventually receiving and constructing the bit map file from a received object table. The bit map asset header comprises information such as ID, type, number of bytes, name of bitmap and the like. The method 600 then proceeds to step 620.

At step 620 the bit map data from the bit map file 602 is processed to form bitmap asset data. Specifically, the data formed in the bit map file is modified to allow subsequent packaging as, e.g., DCII messages or segments. For example, image information from the bit map file may be extracted from the file and segmented according to the DCII message or segment size (i.e., less than 1024 bytes), including position information or other information useful in reconstructing the process data to form the bit map image once again. The method 600 then proceeds to step 625.

At step 625 the palette asset and bit map asset are packaged into messages or segments according to the DCII message/segment format or MPEG2 sequence format. That is, the combined asset header and bit map asset is packaged, along with the palette asset, into a plurality (i.e., N) of segments according to a standard segment length. The method 600 then proceeds to step 630.

At step 630 the messages or segments produced at step 626 are associated with an object table (e.g., a bit map object table). In FIG. 6A the packaged assets are represented as segments 1–5 of N (628). The method 600 then proceeds to step 635 where it is exited.

In the case of a set top terminal receiving a plurality of objects formed according to the method 600 of FIG. 6A and FIG. 6B, it is likely that many objects will be required to implement functions necessary within the STT. For example, different set top terminals may be capable of displaying or utilizing bitmap objects having different resolutions. A set top terminal capable of a high resolution bit map will not be fully utilized if provided with a low resolution bit map. Similarly, a set top terminal capable of displaying only low resolution format bit map objects will be unable to display a high resolution bit map object.

In one embodiment of the invention, individual bitmap objects for high and low resolution are provided within the same table. However, in a preferred embodiment of the invention, individual bitmap objects for high and low resolution are provided within two respective tables, each table having a distinct table type. In this manner a non-used bitmap (i.e., inappropriate bitmap for a receiving platform) is not stored in memory. Therefore, both low and high resolution bit map objects may be generated as distinct bit map table objects and provided to a set top terminal. Information indicative of, e.g., the resolution of the bit map objects will be located within the asset header generated at step 615. In this manner, a set top terminal may examine header information associated with the received object to determine if the received object to determine if the received object may be advantageously utilized by the set top terminal. Since memory considerations are paramount in designing set top terminals, such object selectivity is critical to providing a seamless, cross-platform "look and feel" to an application running on a plurality of set top terminals having different operating parameters, capabilities and functions.

Figure 7A:
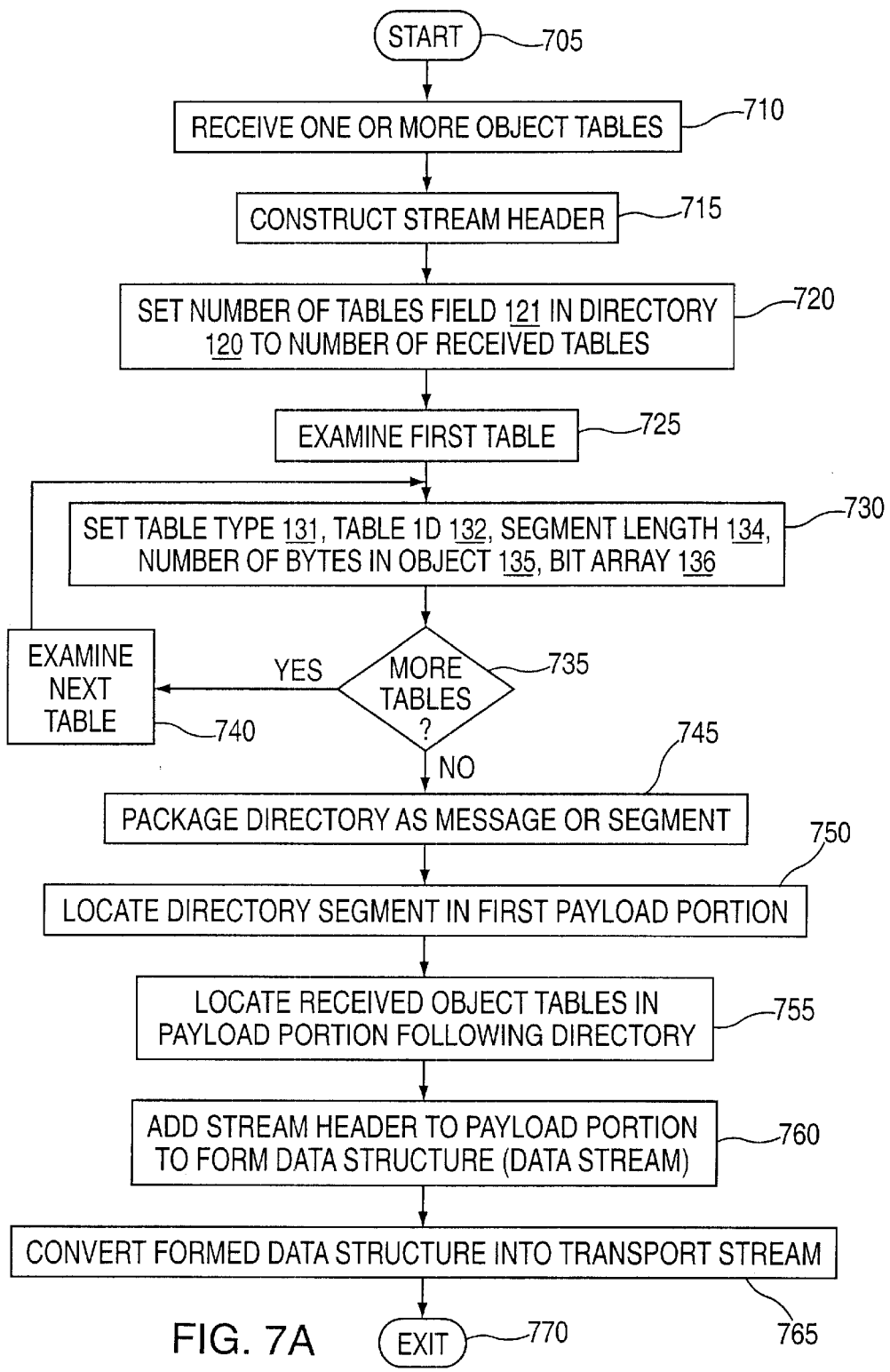
FIG. 7A depicts a high level block diagram of a method for forming an a data stream according to the invention and suitable for use in the processing system of FIG. 3.
Figure 7B:
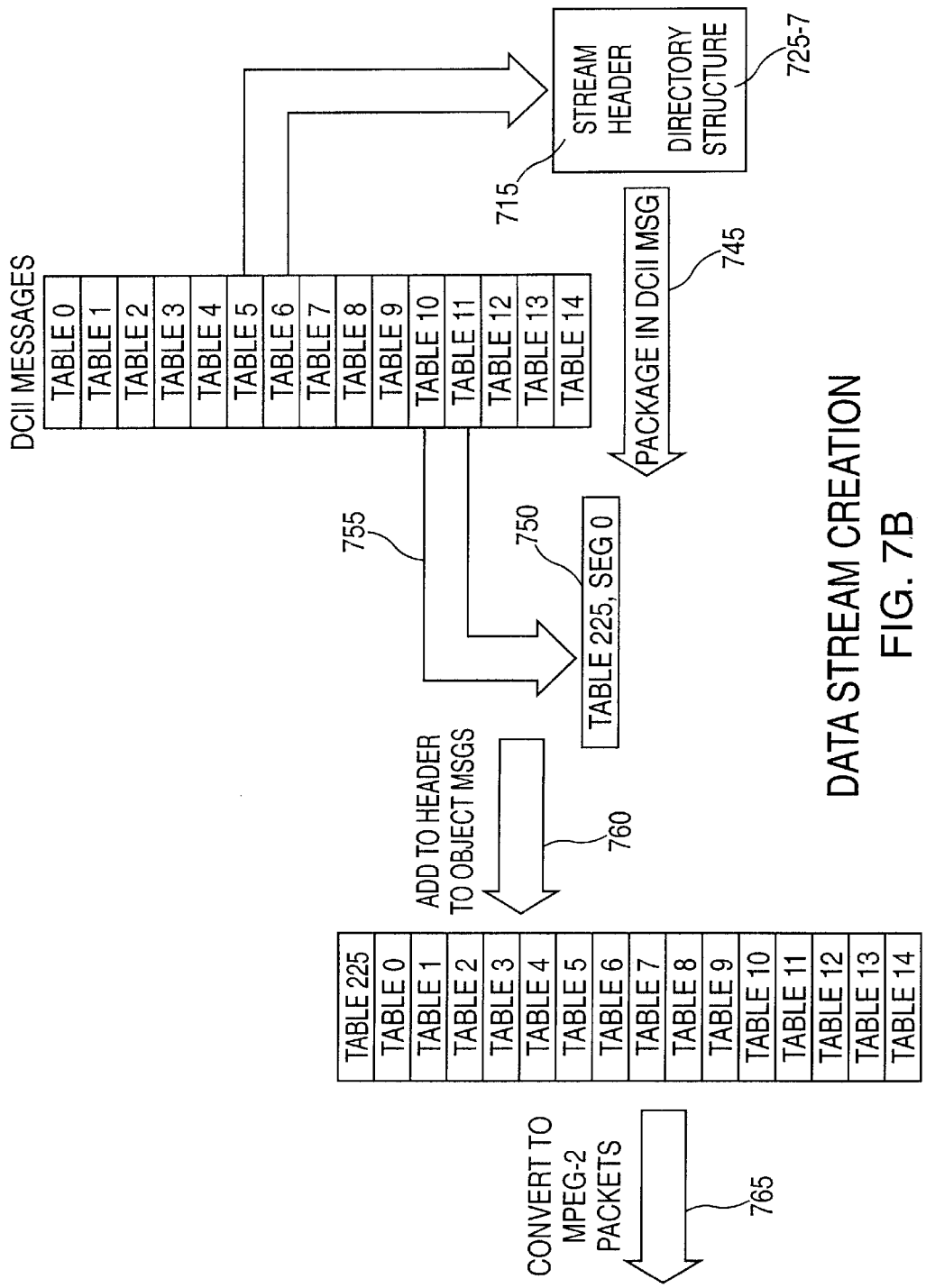
FIG. 7B depicts a flow diagram of the method of FIG. 7A.

FIG. 7A depicts a high level block diagram of a method for forming an a data stream according to the invention and suitable for use in the processing system of FIG. 3. FIG. 7B depicts a flow diagram of the method of FIG. 7A. It should be noted that FIG. 7A and FIG. 7B are different depictions of substantially the same method forming an a data stream. Specifically, FIG. 7A and FIG. 7B include common reference designators indicative of common steps for forming the data stream. Thus, while the following discussion will refer primarily to FIG. 7B, the cited reference designators will be applicable to FIG. 7A and FIG. 7B.

The method 700 is entered at step 705 and proceeds to step 710. At step 710 one or more object tables are received by, e.g., a controller or other processing entity implementing the method 700 of FIG. 7. An exemplary processing entity will be described below with respect to FIG. 8. The method 700 then proceeds to step 715.

At step 715 a stream header is constructed. That is, at step 715 header information such as stream type 111, major version 112, minor version 113, content ID 114 and creation date 115 is determined and used to construct a stream header. The method 700 then proceeds to step 720.

At step 720 the number of tables field 121 within the directory 120 is set equal to the number of received tables. The method 700 then proceeds to step 725. At step 725 the first table is examined to identify parameters and/or quantities necessary to form a table record within the directory structure to be associated with the examined table. The method 700 then proceeds to stop 730.

At step 730 the table type field 131, table ID field 132, segment length field 134, number of bytes in table record field 135, and bit array field 136 of the table record 130 associated with the table examined at step 725 are set. That is, at step 730 all the necessary parameters that may be ascertained by examining a received table are determined and inserted into a table record (e.g., 121) associated with the table examined at step 725. The method 700 then proceeds to step 735.

At step 735 a query is made as to whether more tables are to be examined. That is, a query is made as to whether additional tables have been received at step 710 but not yet examined. If the query at step 735 is answered affirmatively, then the method 700 proceeds to step 740 where the next table is examined, and to step 730 where the table record information associated with the examined table is set. If the query at step 735 is answered negatively, then the method 700 proceeds to step 745. At step 745 the directory formed by steps 725 through 740 is packaged as a message or segment. The message 700 then proceeds to step 750.

At step 750 the packaged directory segment is located in a first payload portion of a data stream. The method 700 then proceeds to step 755.

At step 755 each of the received object tables are located in the payload portion of the data stream following the directory. The order in which the object tables are inserted into the payload portion following the directory is preferably the same as the order in which the objects are referenced by table description records within the directory. The method 700 then proceeds to step 760.

At step 760 the stream header constructed at step 715 is prepended to the payload portion formed at steps 750 and 755 to form a data structure (i.e., a data stream). The method 700 then proceeds to step 765.

At step 765 the data structure or data stream formed at step 760 is converted into a transport stream, illustratively, an MPEG2 transport stream or other suitable transport stream. The method 700 then proceeds to step 770 where it is exited.

The above-described methods and apparatus efficiently determine whether or not a message has been previously received and whether a table is complete. Non-selected tables and redundant messages are quickly discarded and require no additional memory storage.

In anticipation of operating on a variety of set tops, the data structure includes provisions that allow for the selection of tables based on table type. Application features or set top terminal dependent formats may correlate to table types. Each set top determines which table types it is capable of receiving. For example, two different set top types may retrieve different tables containing on-screen display (OSD) data formatted especially for each box's OSD hardware. In addition, this feature may be used to differentiate between the performance capabilities of different boxes by allowing more advanced set tops to retrieve tables for implementing advanced features. Segments from non-selected tables are immediately discarded and therefore consume no memory resources in the set top.

A data stream created at the head-end (e.g., by processing system 300) that contains one or more tables also contains a directory describing the content of each table within the data stream. In one embodiment of the invention the data stream is sent multiple times to enable the recovery of missed messages. In another embodiment of the invention, a relatively long data stream is used containing three NULL directory streams and followed by 4 copies of a standard stream. The standard stream contains 1 table containing stream header and directory information and 1 copy of each of the other tables. The non-NULL directory and plurality of object tables are repeated several times. A receiver or STT utilizes the NULL directories to identify the start of a new data stream including object tables.

As previously noted, when acquiring a new stream, a receiver first acquires the directory which has a fixed known identification number (e.g., 255). From this directory, the system allocates memory for each of the tables it expects to receive. Then, for each received message, it looks up in the record corresponding to the message's table identification number the bit in the record's bit array corresponding to the message's segment. If that bit is set, then the message has not been received and so the system used segment length and number to copy the message payload into the pre-allocated memory location. If the bit is not set indicating that the message has already been received, the message is discarded. When the bit array for a given table is zero, then all segments of that table have been received and the table can be made available to the application.

The individual selection of tables by type is enabled by the table and table type fields. A table contains a logical grouping of data. This can be used to store feature or format information that is used by a set top to execute the application. The table type stored in the directory record of each table is used by the individual set top to determine which tables it will received. When requesting a stream, the application for a given set top model indicates which table types it supports. When processing the directory message, the system compares the table type for each record against the supported table types. If a table is not supported, the bit array in its directory record is cleared to zero indicating that no segments are to be acquired for that table. This prevents segments from unsupported tables from being stored in set top memory.

It must be noted that the terms "set top terminal," "receiver," "information receiver" and "platform" as used in the above description are used to describe apparatus providing the functionality of any information receiver (e.g., a video, audio or data information receiver), illustratively, a receiver integrated within a television set or provided as an audio-video-data component within an information receiver system. Thus, the terms should not in any way be construed as limiting the scope of the present invention. Similarly, the terms "subscriber," "viewer," "information consumer" and other like terms are intended to broadly describe any end user entity receiving information streams, including those information streams formed and/or delivered according to the teachings of the invention.

Although various embodiments which incorporate the teachings of the present invention have been shown and described in detail herein, those skilled in the art can readily devise many other varied embodiments that still incorporate these teachings.

What is claimed is:

1. A data structure for providing at least one object table from a segmented information stream, said data structure comprising:

a first portion and a remaining portion, each of said first and remaining portions comprising at least one information segment, said remaining portion including said at least one object table;

said first portion including, for each object table within said remaining portion, a respective table description record comprising a number of segments field and a segment bit array field;

said number of segments field identifying a number of segments used to provide a respective object table, said segment bit array field including at least one bit corresponding to each of said number of segments in the segmented information stream used to provide said respective object table.

2. The data structure of claim 1, wherein said respective table description record includes a table type field for identifying a type of data included within said respective object table.

3. The data structure of claim 1, wherein:

said data structure provides a plurality of object tables within said remaining portion of said segmented information stream; and said first portion including a number of tables field indicative of a number of tables included within said remaining portion.

4. The data structure of claim 3, wherein each of said respective table description records includes a segment length field and a number of bytes in table field.

5. The data structure of claim 4, wherein said object table comprises a palette asset and a bit map asset, said palette asset defining colors used to form a bit map image, said bit map asset defining a graphical image.

6. In an information distribution system providing data objects as respective pluralities of data tables, where each data table has associated with it a predefined data object, a data structure, comprising:

a first data segment of a segmented information stream including a header portion and a payload portion, said header portion comprising a stream type identifier indicative of a type of data object being provided, and a payload portion, including a directory and said at least one table, said directory occupying at least a first segment within said payload portion of said information stream and including, for each of said at least one tables, a respective table description record, said table description record including indicia of table type and number of table segments, said table description record also including a segment bit array field, said segment bit array field including at least one bit corresponding to each of said number of table segments;

said at least one table occupying one or more contiguous segments within said payload portion of said information stream.

7. In an information stream receiver, a method for processing a received information stream to extract an object table, comprising the steps of:

receiving a directory including a table description record associated with said object table, at least one bit within a segment bit array corresponding to each of a number of table segments being set to a first state;

iteratively performing the following steps until each corresponding bit within said segment bit array is set to a second state:

receiving a plurality of segments, including segments associated with said object table; and changing to a second state, in response to receiving a segment associated with said object table, said bit within said segment bit array corresponding to said received segment.

8. The method of claim 7, wherein said object table is included within a data structure comprising a first portion and a remaining portion, each of said first and remaining portions comprising at least one information segment;

said remaining portion including at least said object table;

said first portion including, for each object table within said remaining portion, a respective table description record comprising a number of segments field and a segment bit array field, said number of segments field identifying a number of segments used to provide a respective object table, said segment bit array field including at least one bit corresponding to each of said number of segments used to provide said respective object table.

9. The method of claim 8, wherein said respective table description record includes a table type field for identifying a type of data included within said respective object table.

10. The method of claim 8, wherein said remaining portion of said segmented information stream comprises a plurality of object tables; and said first portion of said information stream includes a number of tables field indicative of a number of tables included within said remaining portion.

11. The method of claim 10, wherein each of said respective table description records includes a segment length field and a number of bytes in table field.

12. The method of claim 7, wherein said information stream receiver is capable of processing at least a sub-set of said received information stream, said subset being determined with respect to indicator fields included within said received information streams, said indicator fields being associated with respective object tables.

* * * * *

UNITED STATES PATENT AND TRADEMARK OFFICE
CERTIFICATE OF CORRECTION

PATENT NO.   : 6,438,140 B1
DATED        : August 20, 2002
INVENTOR(S)  : Patricia D. Jungers and Dru Nelson It is certified that error appears in the above-identified patent and that said Letters Patent is hereby corrected as shown below:

<u>Column 15,</u>
Line 23, "4" should be -- 1 --.

Signed and Sealed this

Fifth Day of November, 2002

Attest:

Attesting Officer

JAMES E. ROGAN
*Director of the United States Patent and Trademark Office*